C. H. Eccleston,
Securing Teeth to Plates.
N° 77,964.        Patented May 19, 1868.
Fig. 1.   Fig. 2.   Fig. 3.
Witnesses:                                    Inventor:

United States Patent Office.

C. H. ECCLESTON, OF OXFORD, NEW YORK.

Letters Patent No. 77,964, dated May 19, 1868.

LOOPED PIN FOR SECURING ARTIFICIAL TEETH.

*The Schedule referred to in these Letters Patent and making part of the same.*

TO ALL WHOM IT MAY CONCERN:

Be it known that I, C. H. ECCLESTON, of Oxford, in the county of Chenango, in the State of New York, have invented a new and useful Improvement in Looped Pins for Securing Artificial Teeth to a gum or metal plate; and I do hereby declare the following to be a full and exact description thereof, reference being had to the accompanying drawings, forming a part of this specification.

The nature of my invention consists in forming a flat head upon the loop of the pin, in projecting the shanks therefrom at a right angle thereto, and in bending the ends of said shanks to hold them in the body of the tooth.

In the accompanying drawings, E (see Figure 3) represents the head, constituting the loop of the pin. This head is made flat, and comparatively broad, so as to give firm hold to the vulcanized gum or to the metal constituting the plate for the teeth. From this head or loop, at either end thereof, and at right angles thereto, project the shanks $g$, (see Figure 2,) which are inserted in the body of the tooth, to connect and hold the same to its plate. By thus combining the shanks to the head of the loop, the largest possible open space is obtained within the loop, whilst the flat form of the head affords the firmest hold for the gum or metal of the plate, with the least proportionate displacement thereof. In order to secure properly the shanks in the body of the tooth, I bend the ends of said shanks at a right angle therewith, as shown at F, in Figure 1 of the drawings, thus avoiding the cost of a round or flattened head on each point, and yet obtaining a secure fastening thereof, so that they cannot be withdrawn when once embedded in the tooth.

I do not claim a double-headed rivet for insertion in the teeth, nor yet a loop to project from the teeth, when said loop is curved or made without enlargement of the looped portion thereof; but, having fully described my improvement,

I claim as new, and desire to secure by Letters Patent—

An angular loop for securing artificial teeth, when made with an enlarged and flattened head, provided with projecting shanks whose outer ends are bent at an angle therewith, all substantially in the manner herein set forth.

C. H. ECCLESTON.

Witnesses:
H. M. GREENE,
C. A. BENNETT, Sr.